Sept. 16, 1930.  E. OEHMICHEN  1,776,040
APPARATUS FOR THE ENLARGEMENT AND THE SCREEN
PROJECTION OF PHOTOGRAPHIC VIEWS
Original Filed Nov. 16, 1925
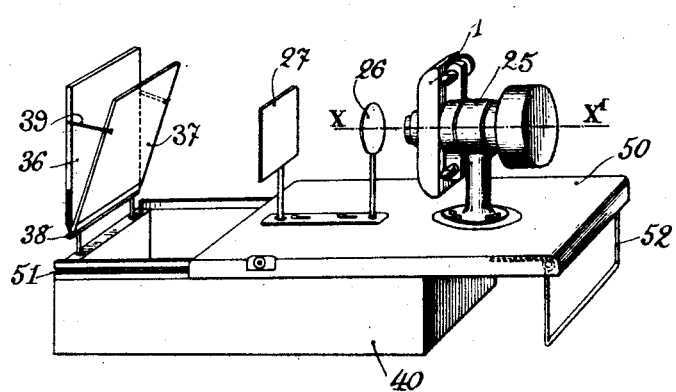
Inventor:-
Etienne Oehmichen
by
Langner, Parry, Card & Langner
Attys.

Patented Sept. 16, 1930

1,776,048

UNITED STATES PATENT OFFICE

ETIENNE OEHMICHEN, OF VALENTIGNEY, FRANCE

APPARATUS FOR THE ENLARGEMENT AND THE SCREEN PROJECTION OF PHOTOGRAPHIC VIEWS

Original application filed November 16, 1925, Serial No. 69,467, and in France May 26, 1925. Divided and this application filed September 30, 1929. Serial No. 396,280.

The present invention is a division of the patent application Serial No. 69,467 and has for its object an apparatus for the enlargement and the screen projection of photographic views of small size upon films.

For the enlargement and the screen projection I make use of a photographic apparatus containing the objective and adapted to be mounted upon an apparatus comprising a condenser and an illuminant.

The annexed drawing shows by way of example an embodiment of my said invention.

1 is the main body of a photographic apparatus, 25 is a ring serving to support the optical system whereby the whole device may pivot about the axis X X¹. In front of the objective 2 is disposed a device comprising a converging lens 26 and a small screen 27 secured thereto; the whole device may be brought—for instance by pivoting about the axis Y Y'—in line with the objective or into the position in which the same is left free.

When the device 26—27 is brought before the objective, the converging lens 26 which is suitably calculated will augment the convergence of the projection beam, thus forming on the screen 27 a reduced image, well focussed, of the film to be projected, without any change in the adjustment of the main objective. At the same time, the projection on the main screen is cut off, and the operator alone can observe the image and its position.

With this arrangement, the operator can make a preliminary examination of the image, and may select the proper images for projection upon the screen; he may preliminarily turn the whole apparatus on the axis X X¹ in the proper direction, according as the question relates to views employed according to the height or the width of the said aperture of the apparatus.

In the path of the beam, and preferably between the condenser and the said film aperture I may dispose a disk carrying glass color screens serving to color the beam or to cut off the actinic rays when the preliminary operations of the enlarging are being performed. Due to the displacements of said disk—whose insertion into the lantern takes place in a light-tight manner by the use of extension pieces on the lanterns, optionally provided with packing—the beam can be intercepted by any one of the screens according to the effect to be obtained such as nonactinic conditions or various colors.

A vertical screen 36 takes up the sheet of photographic paper used for the enlargement, it being attached thereto by means known per se such as a glass plate 37 hinged at the bottom at 38 and whose opening movement is limited by connecting means 39. The said sheet is disposed between the screen and the glass plate, the latter being then folded into place and held by a hook.

40 is a box containing the apparatus and its accessory parts; the box cover 50 is slidable in grooves 51. The projection lantern is mounted on the said cover, as well as the reducing device 26, 27. To provide for the sliding of the cover and to prevent all overhang, an iron wire frame or support 52 is attached to the end of said cover; said frame is hinged to the bottom of the cover and is urged into the vertical position by springs. Upon drawing out the cover, the frame 52 comes automatically into place and forms a support whereby all tipping of the apparatus, due to overhang, will be obviated.

For closing, the frame 52 is raised by hand and is engaged in a recess in the box 40 provided for the purpose; it is thus pressed against the grooves 51 and is thus kept in contact with the cover. At the end of the box 40 is mounted the support for the enlarging screen 36, by means of suitable sockets, holes or studs.

To operate, the cover 50 is slid until an indicating mark thereon coincides with a like mark on the box 40, this corresponding to the exact position of the devices when used for enlargement to a given size. The frame 52 is released, and when in the vertical position it forms a solid support for the apparatus. Obviously, I might substitute for the said frame a like device, for instance suitable struts or props, controlled automatically or by hand, which can be held in place by hooking or in like manner.

Claims:

1. In an apparatus for the enlarging of photographs, the combination of a screen projection apparatus, a screen placed before said apparatus and adapted to receive a sheet of photographic paper, a converging lens removably placed in front of the said projection apparatus a small screen removably mounted before the said lens, said lens and small screen being adapted to be placed in front of the said screen projection apparatus during the centering of the image and to be removed when the image is projected on the first-mentioned screen, a box adapted to contain the several parts above specified and provided with a closing cover, and securing means provided upon said cover whereby the said parts may be secured to the said cover.

2. In an apparatus for the enlarging of photographs, the combination of a screen projection apparatus, a screen placed before said apparatus and adapted to receive a sheet of photographic paper, a converging lens removably placed in front of said projection apparatus, a small screen removably mounted in front of said lens, the said lens and small screen being adapted to be placed in front of the projection apparatus during the centering of the image and to be removed when the image is projected for enlarging purposes, a box adapted to contain the several parts above specified, a sliding cover adapted to close the box and comprising means for removably securing the projection apparatus, the said converging lens and the small screen to the top part of the said cover, and an edge portion pertaining to said box and provided with means for the mounting of the first-mentioned screen.

In testimony whereof I have hereunto affixed my signature.

ETIENNE OEHMICHEN.